(12) United States Patent
Dowty et al.

(10) Patent No.: US 11,970,271 B2
(45) Date of Patent: Apr. 30, 2024

(54) ENERGY HARVESTING RECLINE BUTTON FOR AIRCRAFT SEATING

(71) Applicant: B/E Aerospace, Inc., Winston-Salem, NC (US)

(72) Inventors: Mark B. Dowty, Rural Hall, NC (US); David D. Nicolato, Winston Salem, NC (US); Alen Wyss, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 108 days.

(21) Appl. No.: 17/707,644

(22) Filed: Mar. 29, 2022

(65) Prior Publication Data
US 2023/0312099 A1 Oct. 5, 2023

(51) Int. Cl.
B64D 11/06 (2006.01)
H01H 13/14 (2006.01)
H01H 13/20 (2006.01)

(52) U.S. Cl.
CPC ........ B64D 11/0624 (2014.12); B64D 11/064 (2014.12); B64D 11/0644 (2014.12); H01H 13/14 (2013.01); H01H 13/20 (2013.01)

(58) Field of Classification Search
CPC .............. B64D 11/0624; B64D 11/064; B64D 11/0644; H01H 13/14; H01H 13/70
See application file for complete search history.

(56) References Cited

U.S. PATENT DOCUMENTS

| 8,979,194 | B2 | 3/2015 | Boomgarden et al. |
| 9,973,113 | B1 | 5/2018 | Lou et al. |
| 10,279,917 | B1 | 5/2019 | Wilkey et al. |
| 11,139,666 | B2 | 10/2021 | Patmore et al. |
| 2011/0012396 | A1* | 1/2011 | Laake ...................... 297/188.14 |
| 2017/0015422 | A1 | 1/2017 | Garing |

FOREIGN PATENT DOCUMENTS

| AU | 2015249036 B2 | 5/2020 |
| CN | 110341566 A | 10/2019 |
| CN | 107199920 B | 8/2020 |
| WO | 2016133638 A1 | 8/2016 |

OTHER PUBLICATIONS

Extended European Search Report dated Aug. 8, 2023; European Application No. 23164446.9.
J. F. Schmidt, D. Neuhold, C. Bettstetter, J. Klaue and D. Schupke, "Wireless Connectivity in Airplanes: Challenges and the Case for UWB," in IEEE Access, vol. 9, pp. 52913-52925, 2021, doi: 10.1109/ACCESS.2021.3070141. https://ieeexplore.ieee.org/stamp/stamp.jsp?arnumber=9391672.

* cited by examiner

Primary Examiner — Anthony D Barfield
(74) Attorney, Agent, or Firm — Suiter Swantz IP

(57) ABSTRACT

A recline mechanism is described. The recline mechanism provides for adjusting an angle of a seatback of a passenger seat. The recline mechanism prevents angular adjustments of the seatback when a cylinder and piston assembly is in a locked state and permits the angular adjustments when in an unlocked state. A solenoid is provided to lock and unlock a valve of the recline mechanism. The solenoid is engaged and disengaged in response to receiving electrical signals from a button. The button generates an electrical signal when the button is depressed and again when the button is released. The button includes an electromagnet or a piezoelectric for generating the electrical signals.

14 Claims, 6 Drawing Sheets

ENERGY HARVESTING RECLINE BUTTON FOR AIRCRAFT SEATING

TECHNICAL FIELD

The present invention generally relates to aircraft seating, and more specifically to reclining mechanisms for aircraft seating.

BACKGROUND

Economy class seating for passenger aircraft may include a recline cable routed from the armrest to a recline lock cylinder. When pulled, the recline cable may move for a given length, or throw. By pulling the recline cable, the recline lock cylinder may become unlocked allowing for an angle of the seatback of the passenger seat to be adjusted. Due to the movement of the recline cable, the recline cable is constrained by a bend radius. When the bend radius of the recline cable falls below a select radius, the recline cable may become difficult to pull. The cable may also stretch or elongate due to deformation over time. Due to such cable stretch, the recline cable may require additional throw to unlock the recline lock actuator. Thus, the bend radius and the cable stretch of the recline cable may be a limiting factor in the configuration of the passenger seat. Therefore, it would be advantageous to provide a device, system, and method that cures the shortcomings described above.

SUMMARY

A recline mechanism is disclosed, in accordance with one or more embodiments of the present disclosure. In one illustrative embodiment, the recline mechanism includes a cylinder and piston assembly couplable to a seatback of a passenger seat. In another illustrative embodiment, the cylinder and piston assembly is configurable between a locked state and an unlocked state. In another illustrative embodiment, the cylinder and piston assembly prevents angular adjustment of the seatback when the cylinder and piston assembly is in the locked state and permits the angular adjustment of the seatback when the cylinder and piston assembly is in the unlocked state. In an illustrative embodiment, the recline mechanism includes an actuator coupled to the cylinder and piston assembly for causing the locked state and the unlocked state. In an illustrative embodiment, the recline mechanism includes a button configured to generate and transmit an electrical signal to the actuator in response to the button becoming depressed. In another illustrative embodiment, the actuator causes the unlocked state of the cylinder and piston assembly in response to receiving the electrical signal. In another illustrative embodiment, the button is configured to generate and transmit an additional electrical signal to the actuator in response to the button becoming released. In another illustrative embodiment, the actuator causes the locked state of the cylinder and piston assembly in response to receiving the electrical signal.

A passenger seat is disclosed, in accordance with one or more embodiments of the present disclosure. In one illustrative embodiment, the passenger seat includes a spreader configured to mount to an aircraft. In another illustrative embodiment, the passenger seat includes a seat pan. In another illustrative embodiment, the passenger seat includes a seatback pivotable relative to the seat pan. In another illustrative embodiment, the passenger seat includes an armrest. In another illustrative embodiment, the passenger seat includes a recline mechanism. In another illustrative embodiment, the armrest includes a cylinder and piston assembly coupled to the seatback. In another illustrative embodiment, the cylinder and piston assembly is configurable between a locked state and an unlocked state. In another illustrative embodiment, the cylinder and piston assembly prevents angular adjustment of the seatback when the cylinder and piston assembly is in the locked state and permits the angular adjustment of the seatback when the cylinder and piston assembly is in the unlocked state. In another illustrative embodiment, the recline mechanism includes an actuator coupled to the cylinder and piston assembly for causing the locked state and the unlocked state. In another illustrative embodiment, the recline mechanism includes a button configured to generate and transmit an electrical signal to the actuator in response to the button becoming depressed. In another illustrative embodiment, the actuator causes the unlocked state of the cylinder and piston assembly in response to receiving the electrical signal. In another illustrative embodiment, the button is configured to generate and transmit an additional electrical signal to the actuator in response to the button becoming released. In another illustrative embodiment, the actuator causes the locked state of the cylinder and piston assembly in response to receiving the electrical signal.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
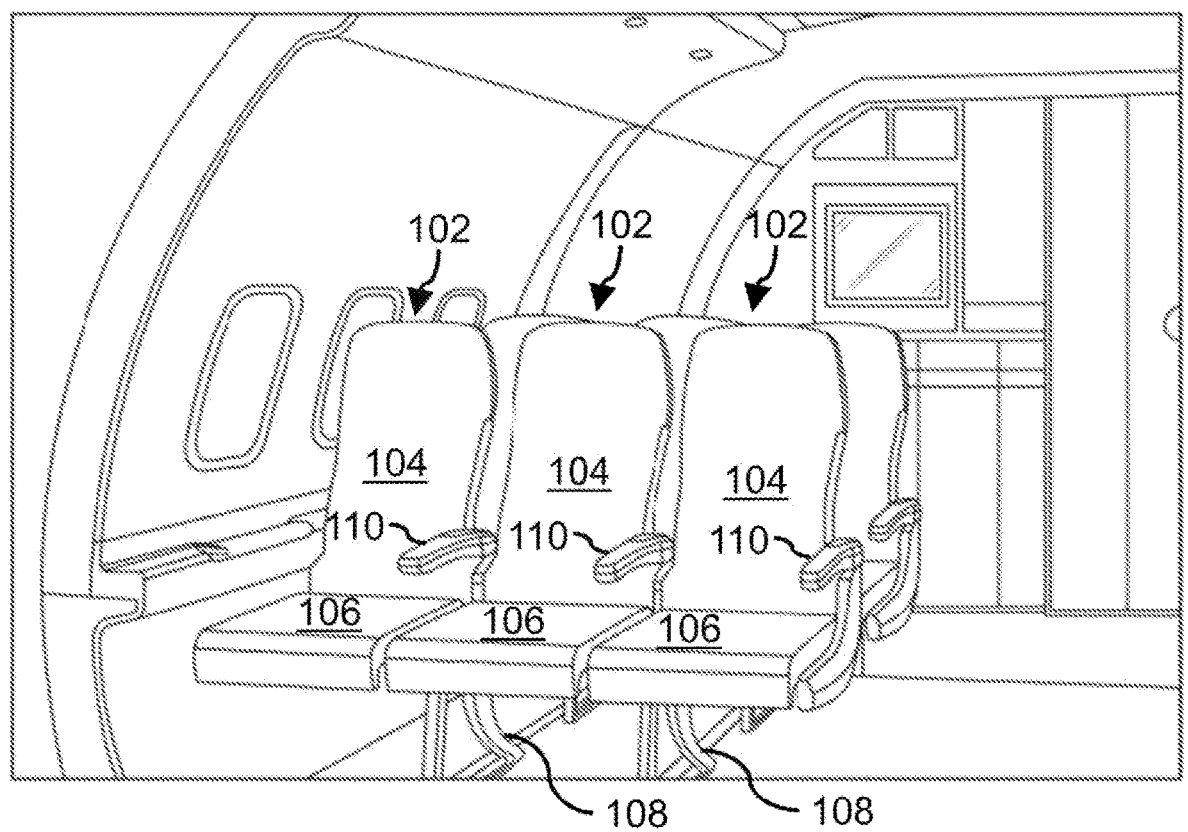
FIG. 1A illustrates a perspective view of an aircraft includes passenger seats, in accordance with one or more embodiments of the present disclosure.
Figure 1B:
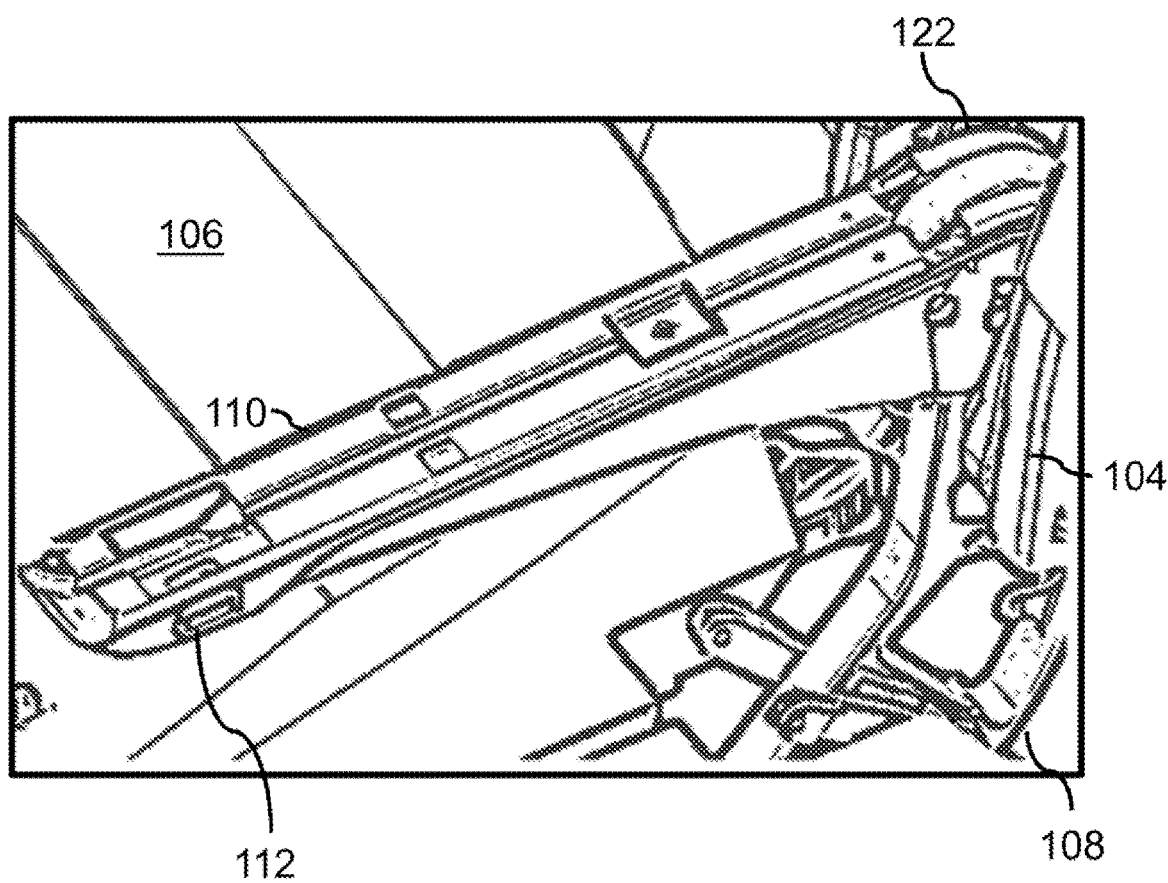
FIG. 1B illustrates a perspective view of an armrest of a passenger seat, in accordance with one or more embodiments of the present disclosure.
Figure 1C:
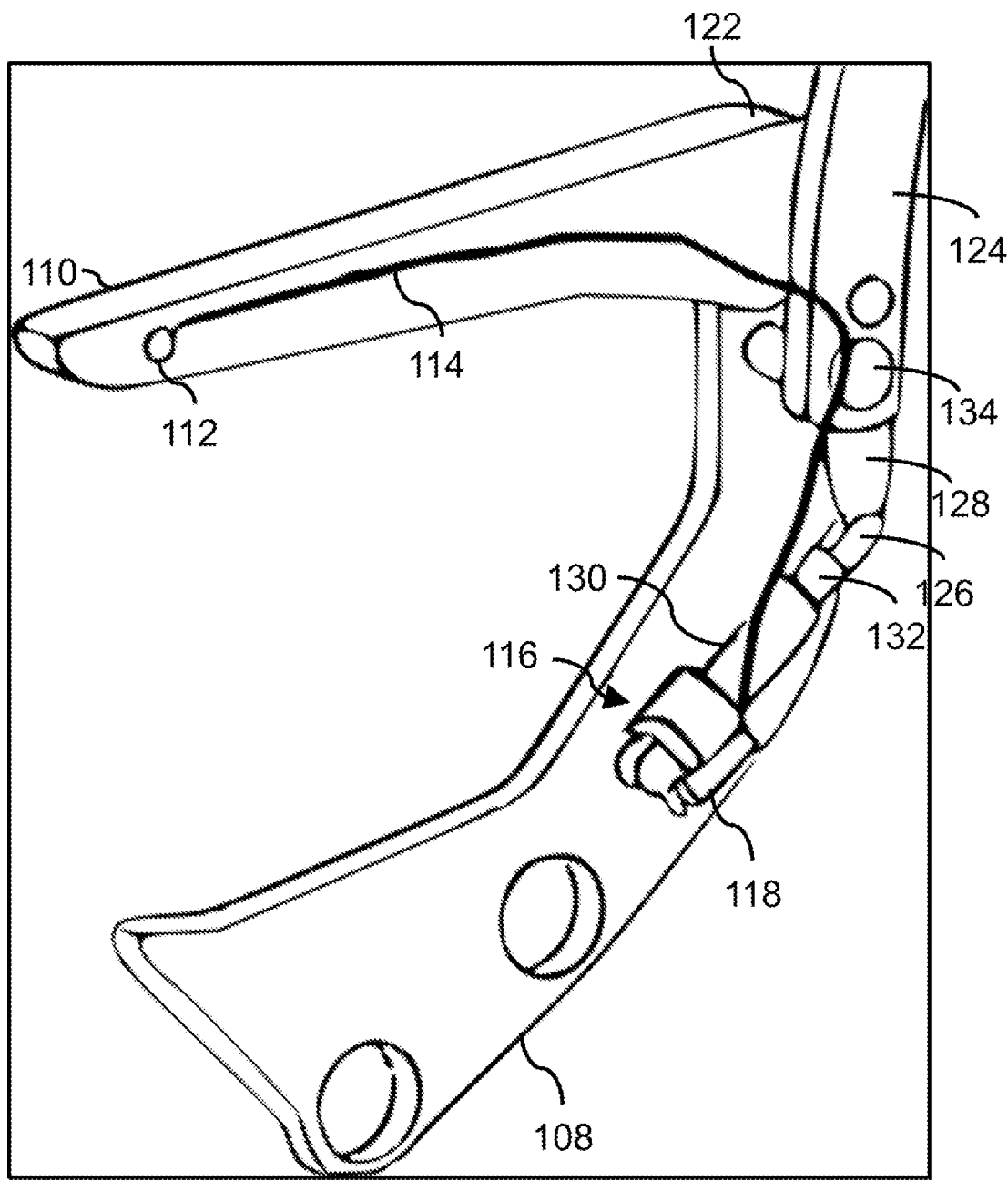
FIG. 1C illustrates a perspective view of a spreader, an armrest, and one or more components of a recline mechanism, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a recline mechanism including a button, an actuator, and a piston and cylinder assembly. The button is configured to harvest energy from a mechanical button press and transmit an electrical signal to an actuator, such as a solenoid. The solenoid unlocks the piston and cylinder assembly in response to receiving the electrical signal. Upon release of the button, the button generates additional energy causing the solenoid to lock the piston and cylinder assembly. By harvesting the energy, the button provides functionality for unlocking the piston and cylinder assembly without a mechanical pull cable. The button also provides the unlock and lock functionality without connecting the button to line power. Thus, the button may allow for a reduced width of the armrest and further allow for armrest designs with cable routing schemes which would otherwise include a bend radius too tight for the mechanical cable pull.

An aircraft passenger seat is described in U.S. Pat. No. 10,279,917, titled "PIVOTING CABLE ACTUATING MECHANISM", which is incorporated herein by reference in the entirety.

Referring now to FIGS. 1A-1D, an example embodiment of an aircraft 100 that includes a plurality of passenger seats 102 is described, in accordance with one or more embodiments of the present disclosure. Each passenger seat 102 includes a seatback 104 and a seat pan 106. The passenger seat 102 also includes a spreader 108 (also referred to as a seat support structure, a seat chassis, and the like) that is coupled to a floor (e.g., by a track) for providing structural support to the seat pan 106 and the seatback 104. In embodiments, the seatback 104 and the seat pan 106 may be separate structures and/or may include one or more shared components. For example, the seatback 104 and the seat pan 106 can have a shared cushion or covering. The seatback 104 may also be configured to move relative to the seat pan 106. For example, the seatback 104 can be configured to transition between upright and reclining positions. In embodiments, the seat pan 106 can also be actuated such that the passenger seat 102 may be configurable between an upright position and a bed position, although this is not intended to be a limitation of the present disclosure. The passenger seat 102 may also include one or more armrests 110. The armrests 110 may be pivotally mounted to the spreader 108 by a pivot joint 122, or may be pivotally mounted to another component of the passenger seat 102.

In embodiments, the passenger seat 102 includes a recline mechanism, by which the passenger seat 102 may be adjusted between an upright position and a recline position. The recline mechanism may include a button 112, a cable 114, a cylinder and piston assembly 116, and an actuator, such as a solenoid 118. The button 112 may be coupled to the armrest 110. The button 112 may be electrically coupled to the solenoid 118 by the cable 114. For example, the cable 114 may be routed through the armrest 110 and coupled to the button 112 and the solenoid 118. The solenoid 118 may be coupled to the cylinder and piston assembly 116 for opening and closing a valve of the cylinder and piston assembly 116, thereby unlocking and locking the cylinder and piston assembly. In embodiments, the armrest 110 defines a hole disposed in an interior side of the armrest 110, the hole suitable for receiving the button 112. The armrest 110 may also define a channel disposed within and along the armrest 110 by which the cable 114 may be routed. Routing the cable 114 within the armrest 110 may be advantageous in preventing the passenger from accessing the cable 114. It is contemplated that the use of the button 112 may allow for armrests 110 including reduced widths. For example, the armrest 110 may include a width of between 1.5 and 1.7 inches.

In embodiments, the button 112 is configured to generate an electrical signal by a mechanical input of the button 112, such as when the button 112 is depressed and again when the button 112 is released. The button 112 may generate the electrical signal in a number of suitable manners. The button 112 may generate the electrical signal by converting mechanical power to electrical power. The button 112 may include, but is not limited to, a piezoelectric or an electromagnet. For example, the piezoelectric may include any piezoelectric element which generates electric charge due to mechanical stresses. By way of another example, the electromagnet may include any electromagnet including a magnet and a coil. Motion of the magnet relative to the coil may induce a current within the coil causing the button to generate the electrical signal. The piezoelectric element or the electromagnet may be selected based on one or more factors, such as, but not limited to, a size, a stroke length, an output voltage, and an output current. The button 112 is thus ability to generate the electrical signal without requiring a connection to a battery or a line power. Generating the electrical signal without the exterior power source may be advantageous in that the button 112 may include a reduced size. By utilizing energy harvesting technology, a power supply to an electronic recline button is not required opening up design space for more narrow armrests.

The button 112 may then transmit the generated electrical signal to the solenoid 118. For example, the button 112 may be coupled to the solenoid 118 by way of the cable 114, or the like. The cable 114 may be routed through the armrest 110. The cable 114 may generally include any electrical cable for carrying electric current from the button 112 to the solenoid 118. The electrical signal transmitted to the solenoid 118 may include a burst of energy, a yes/no signal, or the like. As may be understood, the burst of energy may include current and voltage which is based, at least in part, on the configuration of the button 112. The cable 114 may thus require no "throw", such that the cable 114 may be routed through a tighter bend radius. The button 112 may transmit a first signal when the button 112 is depressed and a second signal when the button 112 is released.

In embodiments, the actuator of the recline mechanism include the solenoid 118. the solenoid 118 may include a coil and a plunger (not depicted). The solenoid 118 may be engaged by supplying current to the coil by which the coil generates an electromagnetic field due to induction. The coil may be energized with current from an aircraft line power, a battery, or the like. The use of the aircraft line power may be advantageous in providing the solenoid 118 continually with power for several seconds, for the duration in which the button 112 is depressed. The electromagnetic field may then motivate the plunger from a disengaged position to an engage position by linear motion. Such solenoid 118 may be arranged in any suitable manner, such as a pull-type solenoid or a push-type solenoid. Such motivation of the plunger may then cause the cylinder and piston assembly 116 to become unlocked. For example, the solenoid 118 may be coupled to the cylinder and piston assembly 116 by a lever 120. As the plunger of the solenoid 118 is translated, the lever 120 may cause a valve of the solenoid 118 to be opened, thereby allowing flow of hydraulic fluid from a first side of the piston to a second side of the piston. The solenoid 118 may thus be engaged upon receiving a first signal from the button 112 and disengaged when a second signal is received from the button 112. Recline adjustments can be achieved by engaging the solenoid 118, and maintaining the solenoid 118 in the engaged position. The engagement of the solenoid 118 may cause the cylinder and piston assembly 116 to be in an unlocked state, allowing for angular position adjustments of the seatback 104. The seatback 104 may then be urged into various angular position while the cylinder and piston assembly 116 is in the unlocked state. The seatback 104 can be positioned in an upright sitting position, for example for taxi, take-off and landing, by depressing the button 112 while leaning forward and allowing the stored force in the cylinder and piston assembly 116 to return the seatback 104 to upright. The seatback 104 can also be positioned in an recline sitting position, for example for long-haul flight, by depressing the button 112 while leaning backwards to motivate the cylinder and piston assembly 116 and the seatback 104. Although the actuator is described and depicted as being the solenoid 118, this is not intended as a limitation of the present disclosure. It is further contemplated that the actuator of the recline mechanism may include any suitable actuator for unlocking and locking the piston and cylinder assembly 116, such as, but not limited to, a stepper motor, a linear actuator, or the like. However, the solenoid 118 may be advantageous in providing rapid and controllable actuation.

In embodiments, the cylinder and piston assembly 116 may be a mechanical actuator including as a hydraulic cylinder 130 and a piston rod 132. The cylinder and piston assembly 116 may further include a control valve (not depicted) within the hydraulic cylinder 130. When the control valve is opened, the piston rod 132 may be released to allow translation of the piston rod relative to the cylinder. The cylinder and piston assembly 116 may thus include a locked state in which the piston rod 132 is prevented from translating relative to the hydraulic cylinder 130 and an unlocked state in which the piston rod 132 is permitted to translate. The cylinder and piston assembly 116 may couplable (e.g., pivotally coupled) to the spreader 108 and the seatback 104, such that the translation of the piston rod 132 provides for angular adjustments of the seatback 104. The cylinder and piston assembly 116 may also be referred to as a gas strut, a fluid strut, a recline lock, a seat recline lock, a recline lock actuator, lock cylinder, and the like. Such cylinder and piston assembly 116 may include any aircraft passenger seat recline lock which may be a commercially available device known in the art under a number of trade names.

The cylinder and piston assembly 116 may be coupled to a frame 124 of the seatback 104. For example, the cylinder and piston assembly 116 may include a clevis end 126. The clevis end 126 may be coupled to the frame 124 by way of a bracket 128, or the like. The bracket 128 may be coupled between the frame 124 and the spreader 108 at a pivot joint 134. The pivot joint 134 may provide a pivotal coupling for the frame 124 and the seatback 104 to the spreader 108. The frame 124 and similarly the seatback 104 may thus pivot relative to the spreader 108 about the pivot joint 134 for adjusting the recline of the seatback 104. By the bracket 128, the piston and cylinder assembly 116 may be pivotally coupled between the spreader 108 and the seatback 104.

Figure 1D:
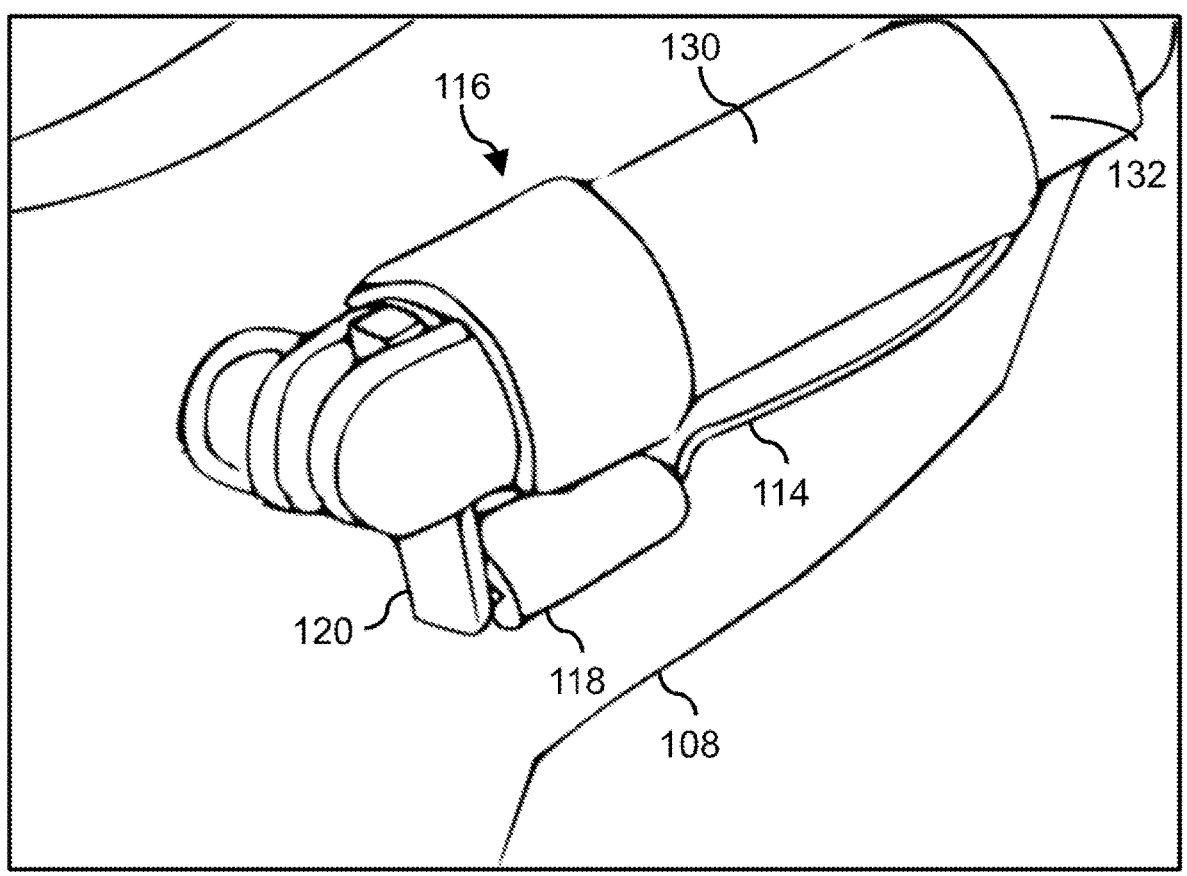
FIG. 1D illustrates a perspective view of a piston and cylinder assembly and a solenoid of a recline mechanism, in accordance with one or more embodiments of the present disclosure.

As depicted in FIG. 1D, the solenoid 118 may be coupled to the cylinder and piston assembly 116 by a lever 120. The solenoid 118 or the cylinder and piston assembly 116 may also include a clevis end (or the like) by which the lever 120 is coupled between the solenoid 118 and the cylinder and piston assembly 116. The lever 120 may be a moveable bar which is pivoted by the solenoid 118 for opening and closing a valve of the cylinder and piston assembly 116, thereby unlocking and locking the movement of the cylinder and piston assembly 116.

Figure 2:
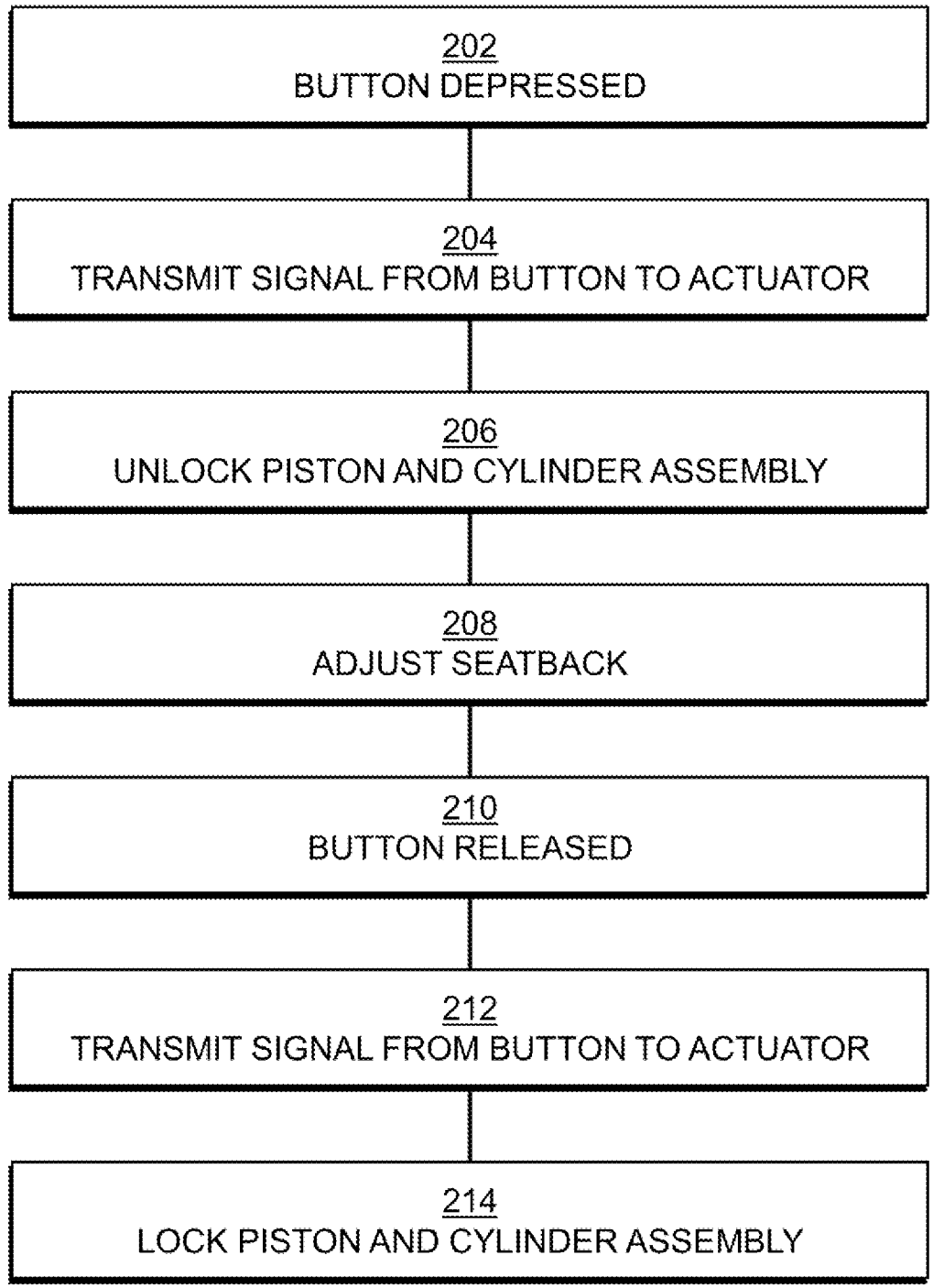
FIG. 2 illustrates a flow diagram for reclining a passenger seat, in accordance with one or more embodiments of the present disclosure.

Referring now to FIG. 2, a flow diagram 200 for operating the recline mechanism of the aircraft seat 102 is described, in accordance with one or more embodiments of the present disclosure. The button 112 may include a depressed state and a released state. At a step 202, the button 112 may become depressed. At a step 204, the button 112 generates and transmits a signal to the actuator (e.g., solenoid 118, or another suitable actuator) in response to becoming depressed. The button 112 may include an electromagnet or a piezoelectric by which the button generates the signal. At a step 206, the piston and cylinder assembly 116 is unlocked or otherwise disengaged, thereby allowing rotation of the seatback 104. The piston and cylinder assembly 116 is disengaged by the solenoid 118 being energized in response to receiving the electrical signal from the button 112, thereby opening a valve of the piston and cylinder assembly 116 through motion of the lever 120. The disengagement of the piston and cylinder assembly 116 may allow movement of the piston rod 132, and similarly the clevis end 126, the bracket 128, the frame 124, and the seatback 104. In a step 208, the user may adjust the seatback to a desired angle by pulling or pushing on the seatback 104. At a step 210, the button 112 may be released (e.g., once a user has manually positioned the seatback 104 at a desired angle). At a step 212, the button 112 may generate and transmit an electrical signal to the solenoid 118 in response to becoming released. At a step 214, the piston and cylinder assembly 116 is locked or otherwise engaged, thereby preventing rotation of the seatback 104. The piston and cylinder assembly 116 is engaged by deenergizing the solenoid 118 in response to receiving the second electrical signal from the button 112, returning the lever 120 and closing the valve of the piston and cylinder assembly 116. Locking the piston and cylinder assembly 116 may then prevent movement of the piston rod 132 and similarly the clevis end 126, the bracket 128, the frame 124, and the seatback 104. Thus, the solenoid 118 remains engaged or otherwise stays on until an additional electrical signal is received when the button 112 is released. Such arrangement is advantageous in allowing the user to lock and unlock the piston and cylinder assembly 116 in a relatively short time period (e.g., the few seconds taken to adjust the seatback angle). Furthermore, the solenoid 118 may automatically deenergize when the button 112 is released. Automatically deenergizing the solenoid 118 may be advantageous to prevent the solenoid 118 from overheating and to prevent the piston and cylinder assembly 116 from remaining unlocked.

Figure 3:
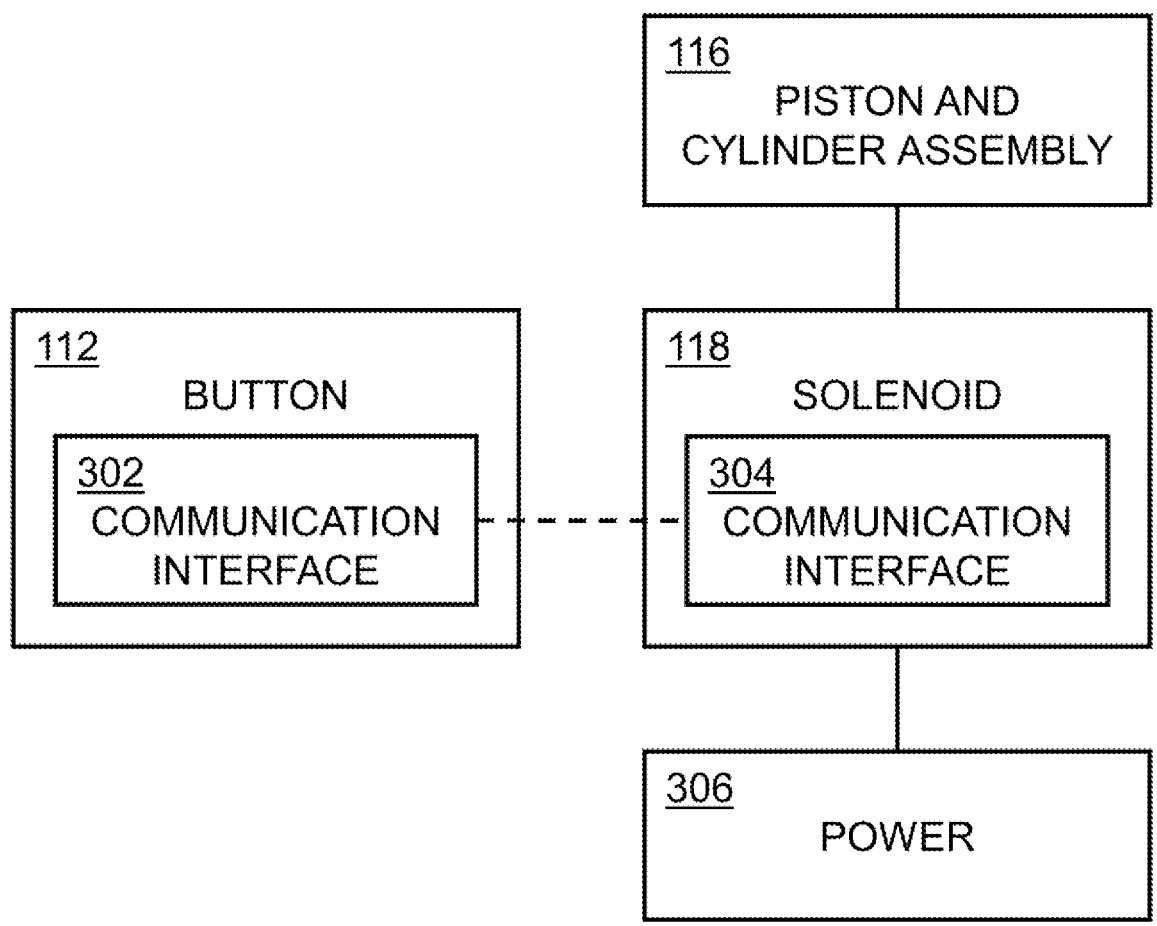
FIG. 3 illustrates a simplified schematic diagram of a recline mechanism, in accordance with one or more embodiments of the present disclosure.

Referring now to FIG. 3, a simplified schematic diagram of a recline mechanism 300 is described, in accordance with one or more embodiments of the present disclosure. The embodiments and the enabling technology described previously herein in the context of the aircraft 100 should be interpreted to extend to the recline mechanism 300. For example, the recline mechanism 300 may be similar to the recline mechanism of the aircraft 100, with the exception that the button 112 includes a communication interface 302 and the solenoid 118 includes a communication interface 304. The communication interface 302 and the communication interface 304 may include any known wireless communication interface and similarly may communication by any known wireless communication protocol suitable for short-range wireless communication onboard the aircraft 100, such as, but not limited to, Wi-Fi, Li-Fi, Bluetooth, Zigbee, and the like. Thus, the button 112 may communicate the electrical signals to the solenoid 118 wirelessly (e.g., without the cable 114) by way of the communication interface 302 and the communication interface 304. A coil of the solenoid 118 may then be engaged with power from a power source 306 (e.g., aircraft line power or a battery) for unlocking the cylinder and piston assembly 116. Where the button 112 includes the communication interface 302, the button 112 may power the communication interface 302 by the electrical signal generated upon being depressed.

Referring generally again to FIGS. 1A-3, although the recline mechanism has been described as including a solenoid 118 for opening and closing the valve of the piston and cylinder assembly 116, this is not intended as a limitation of the present disclosure. It is contemplated that a number of actuators may be suitable for locking and unlocking the piston and cylinder assembly 116. The actuator may include, but is not limited to, one or more of a linear actuator, a rotary actuator, a hydraulic actuator, a pneumatic actuator, an electric actuator, and the like. For example, the actuator may include a stepper motor. The actuator may also include various switches, or the like, by which the actuator is engaged and disengaged in response to receiving the electrical signals from the button 112.

Although much of the present disclosure is directed to the passenger seat 102 being installed within the aircraft 100 or aircraft cabin, it is noted herein the passenger seat 102 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A recline mechanism comprising:
a cylinder and piston assembly couplable to a seatback of a passenger seat, the cylinder and piston assembly configurable between a locked state and an unlocked state, wherein the cylinder and piston assembly prevents angular adjustment of the seatback when the cylinder and piston assembly is in the locked state and permits the angular adjustment of the seatback when the cylinder and piston assembly is in the unlocked state;
an actuator coupled to the cylinder and piston assembly for causing the locked state and the unlocked state; and
a button configured to generate and transmit an electrical signal to the actuator in response to the button becoming depressed; wherein the actuator causes the unlocked state of the cylinder and piston assembly in response to receiving the electrical signal; wherein the button is configured to generate and transmit an additional electrical signal to the actuator in response to the button becoming released; wherein the actuator causes the locked state of the cylinder and piston assembly in response to receiving the electrical signal; wherein the button generates the electrical signal and the additional electrical signal without the button being connected to an electrical power supply; wherein the button generates the electrical signal by converting mechanical power to electrical power.

2. The recline mechanism of claim 1, wherein the button comprises a piezoelectric by which the button is configured to generate the electrical signal and the additional electrical signal.

3. The recline mechanism of claim 1, wherein the button comprises an electromagnet by which the button is configured to generate the electrical signal and the additional electrical signal.

4. The recline mechanism of claim 1, wherein the button is electrically coupled to the actuator by a cable through which the button is configured to transmit the electrical signal and the additional electrical signal to the actuator.

5. The recline mechanism of claim 1, wherein the button is configured to generate a wireless signal by which the button is configured to transmit the electrical signal and the additional electrical signal to the actuators; the button comprising a wireless communication interface; wherein the button is configured to communicate the electrical signal and the additional electrical signal wirelessly by way of the wireless communication interface; wherein the button is configured to power the wireless communication interface by the electrical signal generated upon being depressed.

6. The recline mechanism of claim 1, the cylinder and piston assembly including a valve, the cylinder and piston assembly being in the unlocked state when the valve is open and in the locked state when the valve is closed.

7. The recline mechanism of claim 6, wherein the actuator is a solenoid including a coil and a plunger, wherein the coil is energized in response to the solenoid receiving the electrical signal, wherein the coil generates an electromagnetic field motivating the plunger.

8. The recline mechanism of claim 7, further comprising a lever coupling the plunger and the valve; wherein the lever opens the valve when the plunger is motivated thereby causing the unlocked state.

9. The recline mechanism of claim 7, wherein the solenoid is coupled to an aircraft line power by which the coil is energized.

10. A passenger seat comprising:
a spreader configured to mount to an aircraft;
a seat pan;
a seatback pivotable relative to the seat pan;
an armrest; and
a recline mechanism including:
a cylinder and piston assembly coupled to the seatback, the cylinder and piston assembly configurable between a locked state and an unlocked state, wherein the cylinder and piston assembly prevents angular adjustment of the seatback when the cylinder and piston assembly is in the locked state and permits the angular adjustment of the seatback when the cylinder and piston assembly is in the unlocked state;
an actuator coupled to the cylinder and piston assembly for causing the locked state and the unlocked state; and
a button configured to generate and transmit an electrical signal to the actuator in response to the button becoming depressed; wherein the actuator causes the unlocked state of the cylinder and piston assembly in response to receiving the electrical signal; wherein the button is configured to generate and transmit an additional electrical signal to the actuator in response to the button becoming released; wherein the actuator causes the locked state of the cylinder and piston assembly in response to receiving the electrical signal; wherein the button generates the electrical signal and the additional electrical signal without the button being connected to an electrical power supply; wherein the button generates the electrical signal by converting mechanical power to electrical power.

11. The passenger seat of claim 10, wherein the armrest includes a hole disposed in a side of the armrest in which the button is received.

12. The passenger seat of claim 11, wherein a width of the armrest is between 1.5 and 1.7 inches.

13. The passenger seat of claim 10, wherein the cylinder and piston assembly is pivotally coupled between the spreader and the seatback.

14. The passenger seat of claim 13, wherein each of the seatback and the armrest is pivotally coupled to the spreader.

* * * * *